United States Patent [19]

Chasek

[11] 4,308,613
[45] Dec. 29, 1981

[54] SIMPLEX, PARTY-LINE ELECTROMAGNETIC DATA PACKET TRANSMISSION SYSTEM WITH A SELF SEEKING ALTERNATE ROUTING CAPABILITY

[76] Inventor: Norman E. Chasek, 24 Briar Brae Rd., Stamford, Conn. 06903

[21] Appl. No.: 84,181

[22] Filed: Oct. 12, 1979

[51] Int. Cl.³ .............................................. H04J 6/00
[52] U.S. Cl. ...................................... 370/94; 370/16; 370/103; 455/8
[58] Field of Search .......................... 370/94, 16, 103; 455/59, 8, 15, 16, 25, 136; 375/22; 179/175.3 S

[56] References Cited

U.S. PATENT DOCUMENTS

| | | | |
|---|---|---|---|
| 2,155,821 | 4/1939 | Goldsmith | 455/25 |
| 2,210,089 | 8/1940 | Loughren | 455/59 |
| 3,870,955 | 3/1975 | Ouvrier | 455/8 |
| 3,939,304 | 2/1976 | Ribes | 375/22 |
| 4,048,446 | 9/1977 | Hafner et al. | 370/16 |
| 4,168,400 | 9/1979 | de Cousnon et al. | 370/94 |

Primary Examiner—Douglas W. Olms
Attorney, Agent, or Firm—Parmelee, Johnson, Bollinger & Bramblett

[57] ABSTRACT

The efficient and secure operation of facilities such as roads, pipelines, etc., will increasingly require reliable and low cost means for distribution and collection of operational data along the facility. A method using simplex, party-line transmission of electromagnetic signals for distributing and collecting data packet messages is described which, in the case of random failures, automatically seeks out alternate routes. The system incorporates double and single end-of-message codes that cue the insertion of new messages, primary and secondary routes that are pre-determined by relative path losses and no-message timing signals, transmitted for phase locking and received signal level referencing purposes. The alternate routes are established by adjustable, enhanced antenna, or lens, side lobes. Alternate routing is triggered by an automatic gain control circuit. A preferred binary modulation, message format and station design are described. A method for automatically bridging in-line failed stations that use microwave transmissions is also described.

8 Claims, 8 Drawing Figures

FIG. 1.
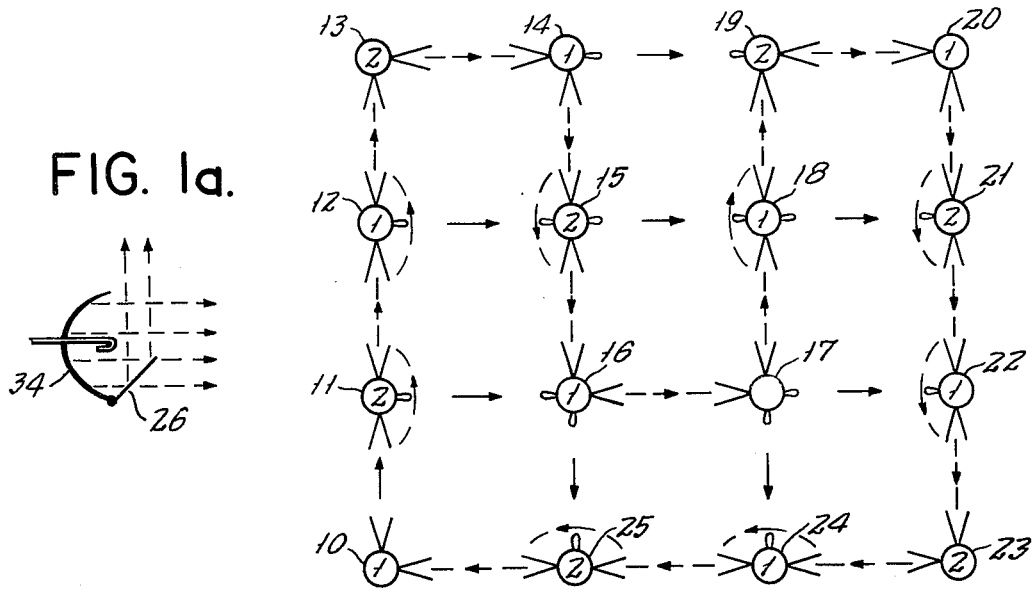
FIG. 1a.
FIG. 2.
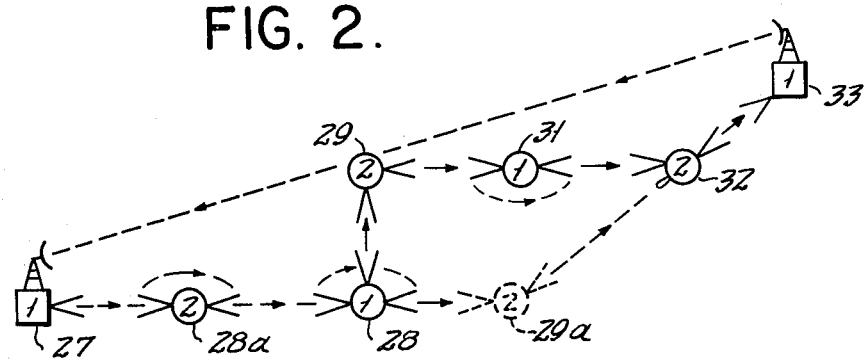
FIG. 3a.
FIG. 3b.
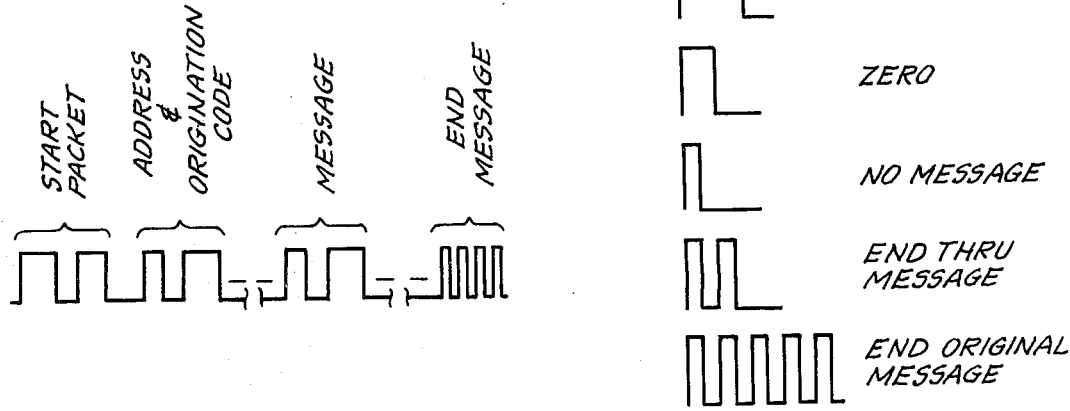

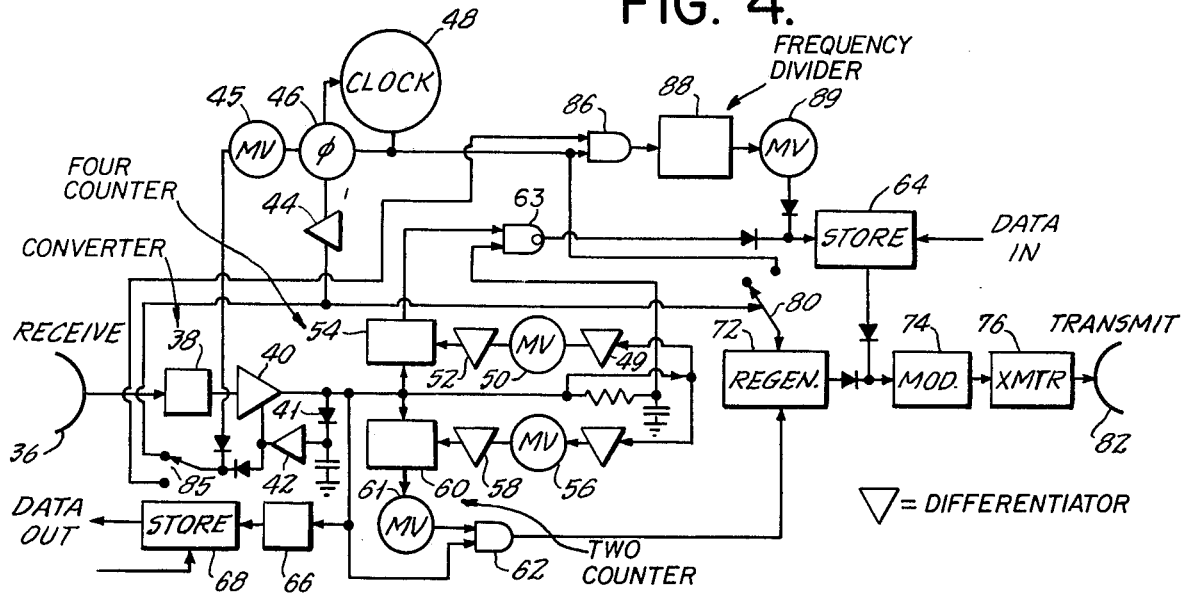

SIMPLEX, PARTY-LINE ELECTROMAGNETIC DATA PACKET TRANSMISSION SYSTEM WITH A SELF SEEKING ALTERNATE ROUTING CAPABILITY

BACKGROUND OF THE INVENTION

Communications networks, that dispatch and collect data from a central location to a large number of geographically dispersed facilities, can be implemented by guided lines, i.e., wireline, or by transmission through the air, such as by radio, optical or infra red waves. There is an increasing need for highly reliable, low cost methods to provide such data communications facilities particularly along roadways. Current communications options include wireline, or fiberline, and broadcasted radio. However, pole facilities and duct space for wirelines are increasingly difficult to obtain and broadcast radio is limited by increasing interference and limited spectral capability.

Reliability in a communications system is usually achieved by having duplicate facilities and by an alternate routing capability. Both methods are costly.

Microwave, infra red or optical links often require expensive towers to obtain suitable line-of-sight clearance. Party line communications along right of ways, such as roadways, are prone to serious reliability problems. Simplex communications links which require the least equipment and facility suffer the potential for major failures and inflexibilities. Failures in complex communications networks occur randomly, often in unanticipated patterns caused by equipment failure, human error, facility destruction, sabotage, etc. All of these factors are considerations in the design of data collection and distribution systems.

SUMMARY

A method for establishing unguided electromagnetic communications links to and from a large number of nodes, dispersed geographically, with a simplex, party line microwave, optical or infra red means that includes an ability to seek out alternate routes by synapse-like methods, is described.

The basis for achieving this capability resides in the combined use of three novel items; (1) duplicate end-of-message codes that follow insertion of locally originated data packets and the subsequent removal of the duplicate code at the next operating node; (2) the establishment of primary and secondary routes, determined by the relative transmission loss of the various possible paths and (3) the inclusion of continuous no-message signals sent whenever binary data is not being transmitted.

The inclusion and subsequent removal of the duplicate end-of-message code prevents the party line from interfering with itself and allows data to be either dispersed or collected on the same simplex line without confusion.

The primary path of the simplex-party line is determined by the direction of the main antenna, or lens, lobes at each node. By introducing an enhanced sidelobe and dispersed main lobes, alternate path provisions are introduced whenever the primary path is blocked. The alternate routing is activated by an automatic gain control voltage. The inclusion of a no-message signal, whenever actual data is not being transmitted, serves to keep all station clocks in synchronization serves as a pilot and to provide a continuous level reference.

The combination of these three techniques makes practical the party-line simplex mode of distributing the collecting data by electromagnetic waves propagating along line-of-sight paths which can then have the ability, when a failure does occur, to establish the alternate route by apparent synapse.

Both a grid and linear network implementation is described. A preferred modulation consists of narrow no-message pulses, wider pulses indicating zeros and widest pulses indicating ones.

The message packet format includes a start-of-message code, a station identification code, the message itself and the duplicate end of message code, which for this example consists of four narrow, no-message, pulses within the space allocated for two binary digits.

Each intermediary station includes a receiver and transmitter with a suitably enhanced antenna, or lens, sidelobe, a station code recognition and a code generation circuit for received and transmitted data, a regeneration circuit for processing through data and for eliminating duplicate end of message codes, when they occur, a message memory for retaining the locally originated message until it is inserted into the data stream and a means for turning off station transmitter when a failure is sensed.

The preferred microwave receiver has dual intermediate frequencies, common AGC, and an alternating frequency plan from station to station with each transmitter frequency alternately shifted by the dual IF difference frequency to provide an automatic bridging capability around failed stations using signal over reach.

If there is inadequate over reach and no other by-pass is possible, the network is configured to restart itself following the failed link with a partial capability and with identification of the failed link. The double IF helps reduce repeater feed around and station leap frogging.

The varied aspects and advantages of this invention will be more fully understood from a consideration of the following detailed description in conjunction with the accompanying drawings.

BRIEF DESCRIPTION OF THE DRAWINGS

FIG. 1 illustrates a grid network with the primary and alternate communications routes noted.

FIG. 1a illustrates the antenna, or lens, with a main lobe and an adjustable side lobe.

FIG. 2 illustrates a linear network and loop closing link.

FIG. 3a illustrates a preferred message packet format.

FIG. 3b illustrates a preferred modified binary code.

FIG. 4 illustrates a preferred block diagram design of an intermediary station.

FIG. 5 illustrates a dual IF amplifier for the microwave system.

FIG. 6 illustrates a preferred regenerator block diagram.

DETAILED DESCRIPTION

FIG. 1 illustrates a grid like network of roadways and intersections that are connected up by a communications network. Simplex receiver-transmitters 10 through 25 are positioned at each intersection using the cleared roadway for line-of-sight propogation. The primary network path follows the number sequence. Each receiver and transmitter antenna or lens has a major lobe and a minor lobe, as illustrated in FIG. 1a. The minor lobe is created by a semi-transparent adjustable flap, 26 which deflects some of the energy focused by parabola 34. The antenna, or lens, side lobe sets up the alternate routes as shown by the dotted lines. A station bypassing loop is also illustrated by the bridging dotted lines. For infra red or optical transmissions, the very narrow major lobe will disperse weak energy levels onto succeeding down stream receivers. In the case of microwave transmission, where the beams are unavoidably wide, a frequency plan that uses a dual IF in which all even stations transmit on $f_1$ and receive on $f_2$ while odd stations receive on $f_1$ and transmit on $f_2$. The frequency difference between $f_1$ and $f_2$ equals the frequency difference between the dual intermediate frequencies. By this means and with automatic gain control, AGC, a means is provided for using the preferred route during normal operation and automatically letting the AGC select an alternate signal from a preceding station to bypass a failed in-line station.

Any failure automatically sets up the alternate route. For example, if station 13 fails, station 12 synapses to station 15, bypassing station 13. Station 14 is automatically squelched. If station 21 fails, station 20 synapses to station 22.

FIG. 2 illustrates a linear system where only bridging is possible to bypass a failure. When a jog in the route occurs, such as between station 28 and 29 and at station 31, there is no alternate route possibility unless a standby station such as 29a, with common visibility between station 28 and station 31, is inserted. In this case, a failure at station 28, 29 or 31 would synapse through the alternate route set up by station 29a. If a standby station is not used, each station is modified to act as a starting terminal in the case of a preceding station failure, so that all stations following the failure will report in.

In a linear, simplex system such as that shown in FIG. 2, there is no natural return route so in order to both distribute and receive information, a return path between the first and last stations would be desirable.

The message packet, illustrated in FIG. 3a, includes a start of message code, a station origination identification and an address code, the message and the duplicate end of message code. The modified binary code used for this preferred system is illustrated in FIG. 3b. Widest pulse represents a one, narrower pulse represents a zero and narrowest pulse represents no message present. If two narrowest pulses fall within the space allocated to a "one" pulse this represents an end of through message. Four narrowest pulses represents the end of a locally originated message.

FIG. 4 illustrates the design of a simplex, party-line intermediary station in block diagram hard wired logic form. The same station can be designed with a microprocessor. The station extracts packets designated for it, originates packets regenerates all information passing through it to remove accumulated distortion and noise and it can, in the case of complete failure to receive preceding signals, restart the message sequence through the system for purposes of partial communications and also to identify where the system failure has occurred.

Antenna, or lens, 36 receives electromagnetic energy through its major lobe and also through an enhanced side lobe. Converter 38, converts the received electromagnetic energy to electrical signals, either video or IF. Amplifier assembly 40 further amplifies the converted energy and also provides automatic gain control by means of level detector 41 and AGC amplifier 42. The output from AGC amplifier 42 is also used to squelch the transmitter. In the case of a microwave system, amplifier 40 preferably has two discrete intermediate frequencies, one a preferred frequency and one to provide a bridging synapse using an over-reaching frequency. This dual IF method of bridging a failed station will function when the feed around loss between receiver and transmitter, at the same station, is less than the loss incurred to the transmitted signal of an over reaching upstream station, which bypasses a failed station. The circuitry intervening between the output of amplifier 40 and the input to transmitter modulator 74, includes the system clock, 48 and its phase locking apparatus 46; the means for recognizing the double end of message code and then reading out the local message, covered by items 50, 52 and 54; the means for eliminating the second end of message code, covered by items 56, 58 and 60; the means of recognizing and storing a message destined for this station, covered by items 66 and 68; a means for regenerating through messages, item 72; a means for starting up the system following a failed repeater covered by items 85, 86, 88 and 89.

Phase locked crystal clock, 48, controls the timing of regenerator 72, the local message read out from memory 64 and the system start up following a failure. The phasing information is derived from the leading edge of each received pulse, differentiated by differentiator 44 and fed into loop 46. If the clock becomes unlocked, it fires one shot multivibrator 45 which acts to squelch the station for one complete all-station message interval. If all alternate possible routings fail, then the station can be set to start up the line at the point of failure by positioning switch 85 onto position 2. Gate 86 is opened during receiver squelch conditions, feeding the output from clock 48 into frequency divider 88 whose output energizes one shot multivibrator 89 which then acts to read out local memory 64. The time interval between memory read outs usually equals the all-station message time interval. Messages received and addressed for this station are identified by the station's address code. When this code is recognized by code recognition circuit 66, that message is stored in memory 68 until released.

When a message is originated in the preceding station, it contains four narrow pulses at the end of its message. Receipt of this code indicates the message from this station can next be inserted into the system. Simultaneously with this notification, the last two pulses of the 4 pulse end of message code is removed. This removal allows that message to pass through all subsequent stations.

The illustrative circuits that accomplish the 4 pulse recognition and 2 pulse removal include differentiator 49, which marks the leading edge of all received pulses, one shot multivibrator, 50, which marks the time interval which the four pulses cover, second differentiator 52 which marks the end of that time interval and counter 54 which produces an output only when a count of four is reached in the time interval set by multivibrator 50. If four pulses are received and counted by counter 54 before it is cleared by differentiator 52, a signal passes through normally open gate 63 causing memory 64 to read out its contents, clocked by clock 48. If there happens to be signals present when counter 54 has reached its count of four, gate 63 is closed by the presence of these signals and that message insertion is skipped. A similar circuit is used to eliminate the last two pulses of a four pulse end of message sequence. One shot multivibrator 56 has a time duration equal to a two narrow pulse interval. If counter 60, which counts to two, receives a two count before it is reset by differentiator 58, then one shot multivibrator 61 is fired for a two pulse interval closing gate 62 for that time period, eliminating the last two pulses.

Gate 62 feeds the received message stream to regenerator 72 where noise and distortion effects are eliminated. The output from regenerator 72 feeds modulator 74 which turns transmitter 76 on and off. Switch 80, in series with the clock feed line into regenerator 72, is normally closed. When either the receiver indicates no received signals or the phase locked loop unlocks, that switch is opened. This squelches further station operation until either adequate signal levels are again received or the phase lock loop is again in operation. This squelch is necessary in grid networks where there are several possible alternate routes. For linear networks and some locations in grids where there are no alternate routes, the system can be set to restart itself. Switch 85 determines this mode of operation. Position 1 is used in grids and position 2 in linear networks.

FIG. 5 describes an illustrative receiver design for the microwave implementation of this invention. It includes conventional mixer 90, local oscillator 91 and broadband IF amplifier 92. The output from amplifier 92 feeds into a network consisting of single pole, double throw switch, 93 and bridging resistors 94 and 95. This network feeds into narrow band filters 96 and 97, the frequency of one filter selected to pass the signal received and converted from the immediately preceding station transmitter and the second from the alternate route station's transmitter. This design presumes that these two stations would use different frequencies. In a grid where only two frequencies are used, only the over reach alternate route would provide a second frequency. However when one of the two received frequencies at a station coincide with that station's transmitted frequency, special attention to potential transmitter-receiver antenna feed around is required. This feed around can be diminished for any type electromagnetic system by careful antenna, or lens, design or by including one bit of blank space between each data bit, so that when the transmitter is turned on, the receiver is gated off. This requires that one bit of delay exist between the reception and the transmission of each data bit and preferably requires using digitally, variable pulse width amplitude modulation.

If a three or more system frequency plan is used, any two signals feeding any station can have different frequencies, each also being different from the transmitter's frequency. An in-line system, with only over reach alternate routing, would work well with a three frequency plan, as would certain grids.

In FIG. 5, IF amplifiers 98 and 99 are automatically gain controlled from AGC amplifier 42, fed by AGC detector diode 41. Isolation IF amplifiers 100 and 101 feed signal to AGC diode 41 and to output signal detector 104. Diodes 102 and 102a are oppositely poled to feed a difference signal into amplifier 103, which controls the position of switch 93. The function of diodes 102 and 102a is to select the stronger signal and move switch 93 into a position that further enhances the strongest signal, thus adding to the normal action of the AGC to emphasize the strongest signal. Bypassing resistors, 94 and 95, provide signal leakage around switch 93 to prevent a self-lock into one position. This circuit can expand signal differentials of perhaps only 1 db., for example, into signal differentials of 12 db. for example, which is sufficient to eliminate mutual interference. The design described also prevents switching instabilities from developing. Such a circuit would provide superior synapsing to one that only employed a conventional automatic gain control.

An illustrative preferred regenerator is shown in FIG. 6. It is comprised of separate regenerators for the no-message pulses, zeros, ones and two-pulse end-of-message codes. The two-pulse end-of-message regenerator consists of leading edge differentiator, 106, feeding narrow-pulse, one shot multivibrator 108, which in turn opens gate 110. Wider pulse, one-shot-multivibrator 114 is fired by the clock, its trailing edge marked by differentiator 116, which fires narrow pulse one shot multivibrator 118 twice to correspond to the second end-of-message pulse. The output from gate 110 is summed together with the outputs from multivibrator 120, which creates the no-message pulse, one-shot multivibrator 122 and gate 128 together regenerate the "zero" width pulses and one shot multivibrator 124 and gate 126 together regenerate the "one" width pulses. Diode-resistor-capacitor 130 provides threshold detection and also stretches the received pulses slightly so that the pulses are always a little wider than required rather than narrower. Clamping diode 132 maintains a constant output voltage even when two or more multivibrators are fired simultaneously from the regenerator.

Starting terminal stations would include clock 48, message storage element 64, modulator 74 and transmitter 76 and antenna or lens 82. A receiver terminal would include antenna or lens 36, converter 38, amplifier 40, AGC 42, and a message storage capability.

I claim:
1. A simplex, party-line transmission system, using line-of-sight electromagnetic propagating signals, collects and distributes digital data packets and automatically seeks out alternate routing, is comprised of,
   a starting terminal and an ending terminal and a multiplicity of intermediary stations, each with the capability of receiving and inserting message packets, and passing along all accumulated messages,
   a preferred route along said intermediary stations, that is determined by minimum path loss and station proximity,
   alternate routes that are established by paths with significantly higher transmission path losses than for said preferred route,
   an identifiable signal, transmitted from all stations during non-message intervals to provide timing and received signal strength information,
   a means for accepting the strongest signals received at each station for retransmission,
   an indicating means for determining when local data packets can be inserted into the message stream for all preceding conditions, and
   a means for temporarily stopping data transmission during sensed failure conditions and restarting transmission when normal operating conditions are restored.

2. Simplex, party-line, data packet station apparatus that is comprised of,
   a receiving antenna or lens with a major lobe and an adjustable enhanced side lobe pointed in a direction to establish an alternative path,
   a receiver connected to said antenna or lens, demodulating the received transmissions from a preceding station, said receiver including an automatic gain control circuit that operates from the strongest signal present, a regeneration circuit connected to said receiver, which threshold detects and regenerates all received pulses, eliminating accumulated noise and distortion and eliminating duplicate end-of-message codes, leaving only one end-of-message code, a station clock, that is phase locked to the received signal's timing, a signal generator, synchronized to said station clock, that produces narrow pulses whose replicas are continuously transmitted during non-message intervals, means for determining when no signals are being received at sufficient levels and when the station clock is unlocked, both conditions closing a gate which prevents said clock's no-message pulse sequence from being transmitted until normal conditions are restored, code recognition means to extract messages addressed for the station, a memory circuit which stores the locally originated message and the start-of-message and end-of-message codes and station address and origination codes, means for determining when an end-of-message pulse sequence has occurred and releasing said stored message packet upon receipt of said sequence, and means for modulating the transmitter with said message sequences and retransmitting said modulated electromagnetic energy, by means of an antenna, or lens, with a main lobe and an adjustable, enhanced side lobe, said side lobe establishing the alternate route.

3. A simplex, party-line transmission system, using line-of-sight electromagnetic propagating signals to collect and distribute digital data packets, and to automatically provide alternate routing, comprising:

a starting terminal and an ending terminal and a multiplicity of intermediary stations, each with the capability of receiving and inserting message packets, and passing along all accumulated messages, a preferred route along said intermediary stations, that is determined by minimum path loss and station proximity, alternate routes that are established by paths with significantly higher transmission path losses than for said preferred route, a synchronized, identifiable pulsed signal, transmitted from all stations, during non-message intervals, a receiver with an automatic gain control at each station, means for generating and storing a message data packet, said packet including a start-of-message code, a station address and identification code, the message and a duplicate end of message code, signal regeneration means that includes means to eliminate the duplicate end of message code when it is received, a phase locked clock for generating timing information that is phase locked to pulse signals received from previous stations, means for determining when phase lock is lost and also when no signals are being received and upon either condition squelching station retransmissions and restarting all functions when phase lock and adequate received signal conditions are restored, means for injecting said message data packet following receipt of the duplicate end of message code, and means for identifying a received message directed for a specific station and for storing said message at said station.

4. A simplex, party-line transmission system, using line-of-sight electromagnetic propagating signals as claimed in claim 1 or 3, in which:

alternate routes for the system are provided by pointing an adjustable side lobe from each receiver and transmitter antenna, or lens, to other alternate stations with common visibility.

5. A simplex, party-line transmission system, using line-of-sight electromagnetic propagating signals as claimed in claim 1 or 3, in which:

the bridging of a failed microwave station among three or more stations which fall more or less in a straight line and wherein signal over reach occurs is provided by using two intermediate frequencies and a common automatic gain control in the receiver of such stations and using a frequency plan in which alternate stations use the same transmitted frequency and intervening stations use an offset transmitted frequency, differing from the prior frequency by the frequency difference of said two intermediate frequencies.

6. A simplex, party-line transmission system, using line-of-sight electromagnetic propagating signals as claimed in claim 1 or 3, in which:

the system is restarted following a failed station, whenever alternate or bypass routing is not possible, to provide partial operation and identification of the failed station.

7. A simplex, party-line transmission system as claimed in claim 3, in which:

means are provided in a second station for sensing failure in a preceding station and for then connecting the station clock to a frequency divider for marking station message duration intervals, and means are provided for using this station message duration interval marker for periodically feeding locally stored messages to a transmitter modulator in said second station and during all other times, for feeding no-message indications pulses to said transmitter modulator, whereby partial operation of the system is provided in spite of the failed station and the failed station can be automatically identified by the messages from said second station.

8. A simplex, party-line transmission system as claimed in claim 1 or 3, in which:

digitally variable amplitude modulated pulse width is used to transmit data and clock information, and a one data-bit-wide time slot is always empty between each data bit transmission time slot, and means are provided for enabling a station in the system to transmit and receive on the same frequency including:

means at the station for delaying all transmitted data by one data bit time slot relative to all received data, and means at the station for squelching the receiver at the station whenever the transmitter at the station is transmitting.

* * * * *